United States Patent
Huang et al.

(10) Patent No.: US 8,528,893 B2
(45) Date of Patent: Sep. 10, 2013

(54) PAPER FEEDING DEVICE AND MULTI-FUNCTION PRINTER USING THE SAME

(75) Inventors: Chen-Fu Huang, New Taipei (TW); Po-Chih Chang, New Taipei (TW); Pei-Chi Ho, New Taipei (TW)

(73) Assignees: Cal-Comp Electronics & Communications Company Limited, New Taipei (TW); Kinpo Electronics, Inc., New Taipei (TW)

( * ) Notice: Subject to any disclaimer, the term of this patent is extended or adjusted under 35 U.S.C. 154(b) by 0 days.

(21) Appl. No.: 13/555,204

(22) Filed: Jul. 23, 2012

(65) Prior Publication Data

US 2013/0134666 A1 May 30, 2013

(30) Foreign Application Priority Data

Nov. 24, 2011 (TW) .............................. 100143150 A (51) Int. Cl.
*B65H 5/00* (2006.01)
*G03G 21/00* (2006.01)
*G03G 21/16* (2006.01)

(52) U.S. Cl.
USPC ..................... 271/10.04; 271/10.13; 399/124; 399/125

(58) Field of Classification Search
USPC ........... 271/10.04, 3.14, 3.01, 10.13; 399/21, 399/124, 363, 267, 125
See application file for complete search history.

(56) References Cited

U.S. PATENT DOCUMENTS

| | | | | |
|---|---|---|---|---|
| 5,016,868 A | * | 5/1991 | Ohtsuka et al. | 271/273 |
| 6,536,762 B1 | * | 3/2003 | Sheng et al. | 271/273 |
| 6,616,136 B1 | * | 9/2003 | Huang et al. | 271/10.13 |
| 6,619,649 B2 | * | 9/2003 | Takamatsu | 271/3.14 |
| 6,837,489 B2 | | 1/2005 | Kim | |
| 7,702,276 B2 | * | 4/2010 | Kawashima | 399/367 |
| 7,957,674 B2 | * | 6/2011 | Yamaguchi | 399/124 |
| 7,984,907 B2 | * | 7/2011 | Chen | 271/273 |
| 2008/0118270 A1 | * | 5/2008 | Sugiyama | 399/125 |
| 2010/0054808 A1 | * | 3/2010 | Yamaguchi | 399/124 |

FOREIGN PATENT DOCUMENTS

| | | | |
|---|---|---|---|
| JP | 03279131 A | * | 12/1991 |
| TW | M290160 | | 5/2006 |
| TW | 201024096 | | 7/2010 |

* cited by examiner

*Primary Examiner* — Patrick Cicchino
(74) *Attorney, Agent, or Firm* — Jianq Chyun IP Office (57) ABSTRACT

A paper feeding device and a multi-function printer using the same are provided. The paper feeding device includes a frame, a top cover, a set of gear chains, a power unit and a set of driving gears. The set of gear chains and the power unit are disposed on a side of the frame. The set of driving gears is disposed on the top cover. When the top cover is closed relatively to the frame, the set of driving gears interferes with the power unit, and the power unit provides a power to enable the set of driving gears to rotate, so as to drive the set of gear chains. When the top cover is opened relatively to the frame, the set of driving gears releases interference with the power unit and the set of gear chains, and the set of gear chains is at a free rotation status.

18 Claims, 8 Drawing Sheets

PAPER FEEDING DEVICE AND MULTI-FUNCTION PRINTER USING THE SAME

CROSS-REFERENCE TO RELATED APPLICATION

This application claims the priority benefit of Taiwan application serial no. 100143150 filed on Nov. 24, 2011. The entirety of the above-mentioned patent application is hereby incorporated by reference herein and made a part of this specification.

BACKGROUND OF THE INVENTION

1. Field of the Invention

The present invention generally relates to a paper feeding device and a multi-function printer, in particular, to a paper feeding device capable of releasing paper jam and a multi-function printer using the paper feeding device.

2. Description of Related Art

Along with development of science and interconnection of social network, various electronic and electrical products become indispensable tools in daily life. For example, during working, machines used in offices include a computer, a printer, a fax machine, and a duplicator, in which a working efficiency of the printer, the duplicator, and the fax machine using paper may be affected by a paper-in function.

For example, for a multi-function printer having scanning and printing functions, an automatic paper feeding device is disposed thereon, so as to drive the carried blank paper to enter the multi-function printer to perform printing work or scanning work. Before printing or scanning, a user places the paper at a paper-in device (for example, a paper carrying tray). During printing or scanning, the paper feeding device enables the paper to be transferred in the multi-function printer, and the printing device or the scanning device forms images on the paper.

Figure 1:
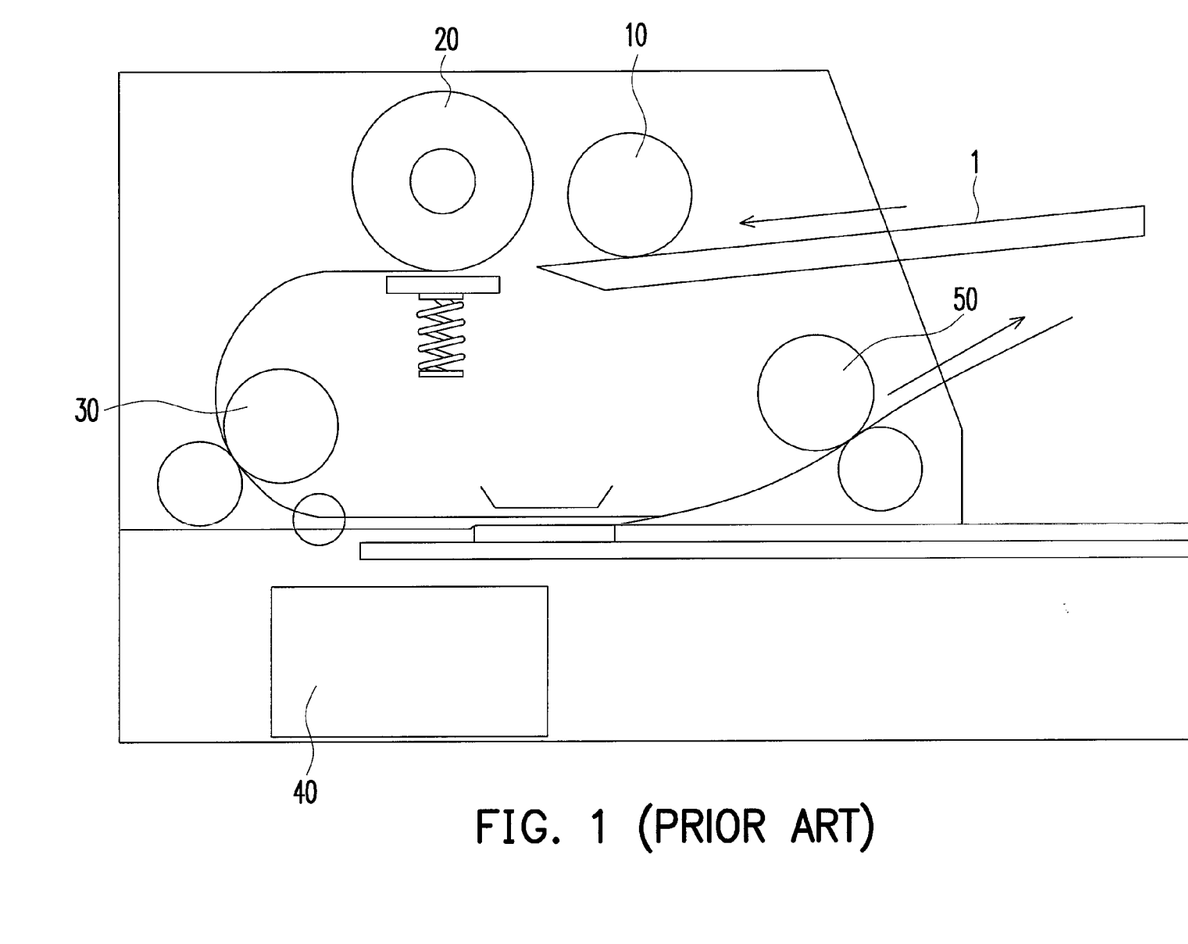
FIG. 1 is a schematic view of a conventional paper feeding device.
Figure 2:
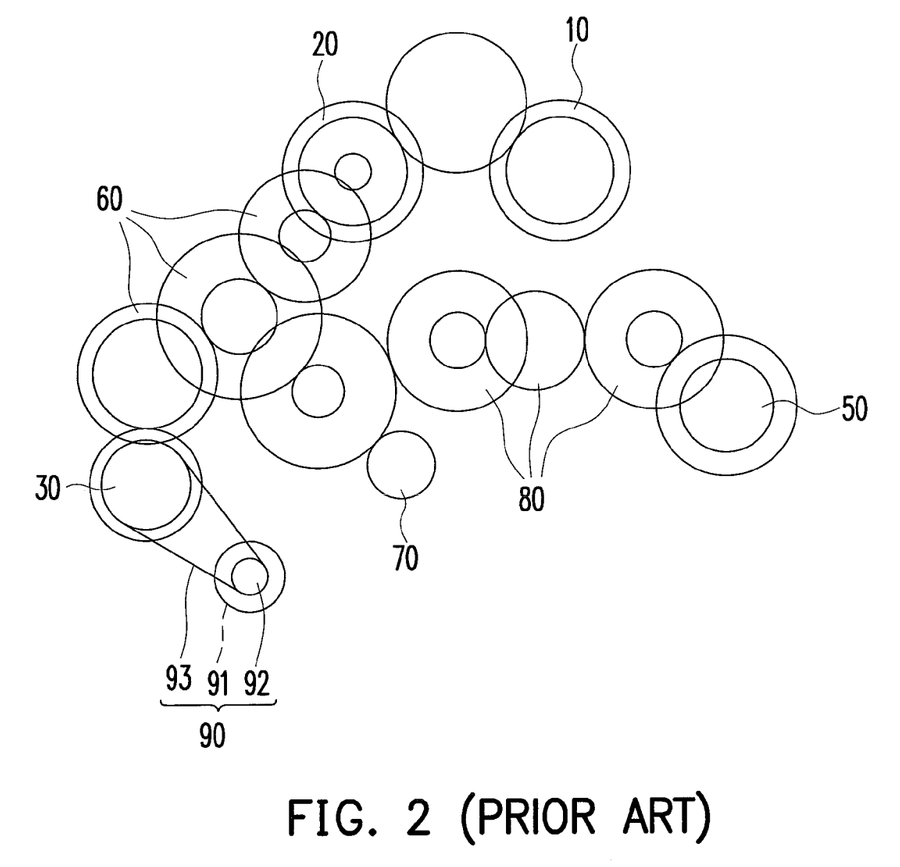
FIG. 2 is an internal perspective view of the paper feeding device of FIG. 1.

FIG. 1 is a schematic view of a conventional paper feeding device. FIG. 2 is an internal perspective view of the paper feeding device of FIG. 1. Referring to FIG. 1 and FIG. 2, the conventional paper feeding device includes a paper-in roller 10, a paper separating roller 20, a scanning roller 30, a scanning module 40, a paper-out roller 50, a first gear set 60, a motor 70, a second gear set 80, and a jam removing device 90. After paper 1 is sent to the conventional paper feeding device, after the first gear set 60, the second gear set 80, and a plurality of connection gears are driven through the motor 70, the paper 1 passes through the paper-in roller 10, the paper separating roller 20, the scanning roller 30, and the scanning module 40 in sequence, and finally is sent out by the paper-out roller 50. When the paper 1 is jammed between the paper-in roller 10 and the paper separating roller 20, a top cover of the conventional paper feeding device may be opened, and the paper 1 may be pulled out. When the paper 1 is jammed between the scanning roller 30 and the paper-out roller 50, the jam removing device 90 may be rotated, so as to enable the paper 1 to exit along a direction. However, the jam removing device 90 of the conventional paper feeding device only allows the paper 1 to exit along a single direction, if the paper exits when the user is in an unclear state, the paper 1 may be dragged or broken. In addition, the jam removing device 90 consists of a gear 91, a pulley 92, a belt 93, and other components, thereby increasing the number of parts and a manufacturing cost.

SUMMARY OF THE INVENTION

Accordingly, the present invention is directed to a paper feeding device, capable of simplifying a paper jam component and not limiting jammed paper to exit in a single direction.

The present invention is also directed to a multi-function printer, including a paper feeding device capable of simplifying a paper jam component and not limiting jammed paper to exit in a single direction.

The present invention provides a paper feeding device, applicable to a multi-function printer. The paper feeding device includes a frame, a top cover, a set of gear chains, a power unit, and a set of driving gears. The top cover is disposed on the frame. The set of gear chains is disposed on a side of the frame. The power unit is disposed adjacent to the set of gear chains, and located on the side of the frame together with the set of gear chains. The set of driving gears is disposed on the top cover. When the top cover is closed relatively to the frame, the set of driving gears interferes with the power unit, and the set of driving gears is engaged with the set of gear chains, and the power unit provides a power to enable the set of driving gears to rotate, so as to drive the set of gear chains. When the top cover is opened relatively to the frame, the set of driving gears releases interference with the power unit and the set of gear chains along with moving of the top cover, and the set of gear chains is at a free rotation status.

In an embodiment of the paper feeding device of the present invention, the set of gear chains includes a first shaft gear, a second shaft gear, a scanning roller module, a paper-out roller module, a first slave gear, a second slave gear, a third slave gear, and a fourth slave gear. The first shaft gear is connected to the scanning roller module, and the second shaft gear is connected to the paper-out roller module, and the first slave gear, the second slave gear, the third slave gear, and the fourth slave gear are located between the first shaft gear and the second shaft gear. In addition, the set of driving gears includes a third shaft gear and a paper-in roller module. The third shaft gear is configured between the first shaft gear and the second shaft gear, and the third shaft gear is connected to the paper-in roller module. When the third shaft gear is driven through the power unit, the third shaft gear rotates to drive the paper-in roller module to rotate, and the third shaft gear drives the first slave gear, the second slave gear, the third slave gear, and the fourth slave gear to rotate, so that the first shaft gear and the second shaft gear rotate to drive the scanning roller module and the paper-out roller module to rotate.

In an embodiment of the paper feeding device of the present invention, the power unit includes a connection gear, an engagement member, and a motor. The connection gear is engaged between the third shaft gear and the engagement member, and the motor is used to drive the engagement member to rotate, so as to enable the connection gear to drive the third shaft gear to rotate.

In an embodiment of the paper feeding device of the present invention, the motor is a stepping motor.

In an embodiment of the paper feeding device of the present invention, the motor is a direct current motor.

In an embodiment of the paper feeding device of the present invention, the engagement member is a gear.

In an embodiment of the paper feeding device of the present invention, the engagement member is a worm.

In an embodiment of the paper feeding device of the present invention, the paper feeding device further includes a bottom cover, in which the frame is assembled on the bottom cover, and the top cover has a first end and a second end. The first end is pivoted to the bottom cover, and the second end is adapted to be opened relatively to the bottom cover by using the first end as a rotation center.

The present invention provides a multi-function printer, which includes a body and a paper feeding device, and the paper feeding device is assembled on the body. The paper feeding device includes a frame, a top cover, a set of gear chains, a power unit, and a set of driving gears. The top cover is disposed on the frame. The set of gear chains is disposed on a side of the frame. The power unit is disposed adjacent to the set of gear chains, and located on the side of the flame together with the set of gear chains. The set of driving gears is disposed on the top cover. When the top cover is closed relatively to the frame, the set of driving gears interferes with the power unit, and the set of driving gears is engaged with the set of gear chains, and the power unit provides a power to enable the set of driving gears to rotate, so as to drive the set of gear chains. When the top cover is opened relatively to the frame, the set of driving gears releases interference with the power unit and the set of gear chains along with moving of the top cover, and the set of gear chains is at a free rotation status.

In an embodiment of the multi-function printer of the present invention, the set of gear chains includes a first shaft gear, a second shaft gear, a scanning roller module, a paper-out roller module, a first slave gear, a second slave gear, a third slave gear, and a fourth slave gear. The first shaft gear is connected to the scanning roller module, and the second shaft gear is connected to the paper-out roller module, and the first slave gear, the second slave gear, the third slave gear, and the fourth slave gear are located between the first shaft gear and the second shaft gear. In addition, the set of driving gears includes a third shaft gear and a paper-in roller module. The third shaft gear is configured between the first shaft gear and the second shaft gear, and the third shaft gear is connected to the paper-in roller module. When the third shaft gear is driven through the power unit, the third shaft gear rotates to drive the paper-in roller module to rotate, and the third shaft gear drives the first slave gear, the second slave gear, the third slave gear, and the fourth slave gear to rotate, so that the first shaft gear and the second shaft gear rotate to drive the scanning roller module and the paper-out roller module to rotate.

In an embodiment of the multi-function printer of the present invention, the power unit includes a connection gear, an engagement member, and a motor. The connection gear is engaged between the third shaft gear and the engagement member, and the motor is used to drive the engagement member to rotate to enable the connection gear to drive the third shaft gear to rotate.

In an embodiment of the multi-function printer of the present invention, the motor is a stepping motor.

In an embodiment of the multi-function printer of the present invention, the motor is a direct current motor.

In an embodiment of the multi-function printer of the present invention, the engagement member is a gear.

In an embodiment of the multi-function printer of the present invention, the engagement member is a worm.

In an embodiment of the multi-function printer of the present invention, the paper feeding device further includes a bottom cover, in which the frame is assembled on the bottom cover, and the top cover has a first end and a second end. The first end is pivoted to the bottom cover, and the second end is adapted to be opened relatively to the bottom cover by using the first end as a rotation center.

Based on the above mentioned, in the paper feeding device of the present invention, the set of driving gears is disposed on the top cover, so that when the top cover is opened relatively to the frame, the set of driving gears releases engagement with the power unit and the set of gear chains, so that the set of gear chains is at a free rotation status. Therefore, a user may conveniently pull jammed paper out from the set of gear chains, and the jammed paper exits from the paper feeding device. The multi-function printer applying the paper feeding device needs not to have a mechanism used to release paper jam, thereby reducing the number of parts of the multi-function printer, so as to lower a manufacturing cost.

In order to make the aforementioned features and advantages of the disclosure comprehensible, preferred embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to the present embodiments of the invention, examples of which are illustrated in the accompanying drawings. Wherever possible, the same reference numbers are used in the drawings and the description to refer to the same or like parts.

Figure 3:
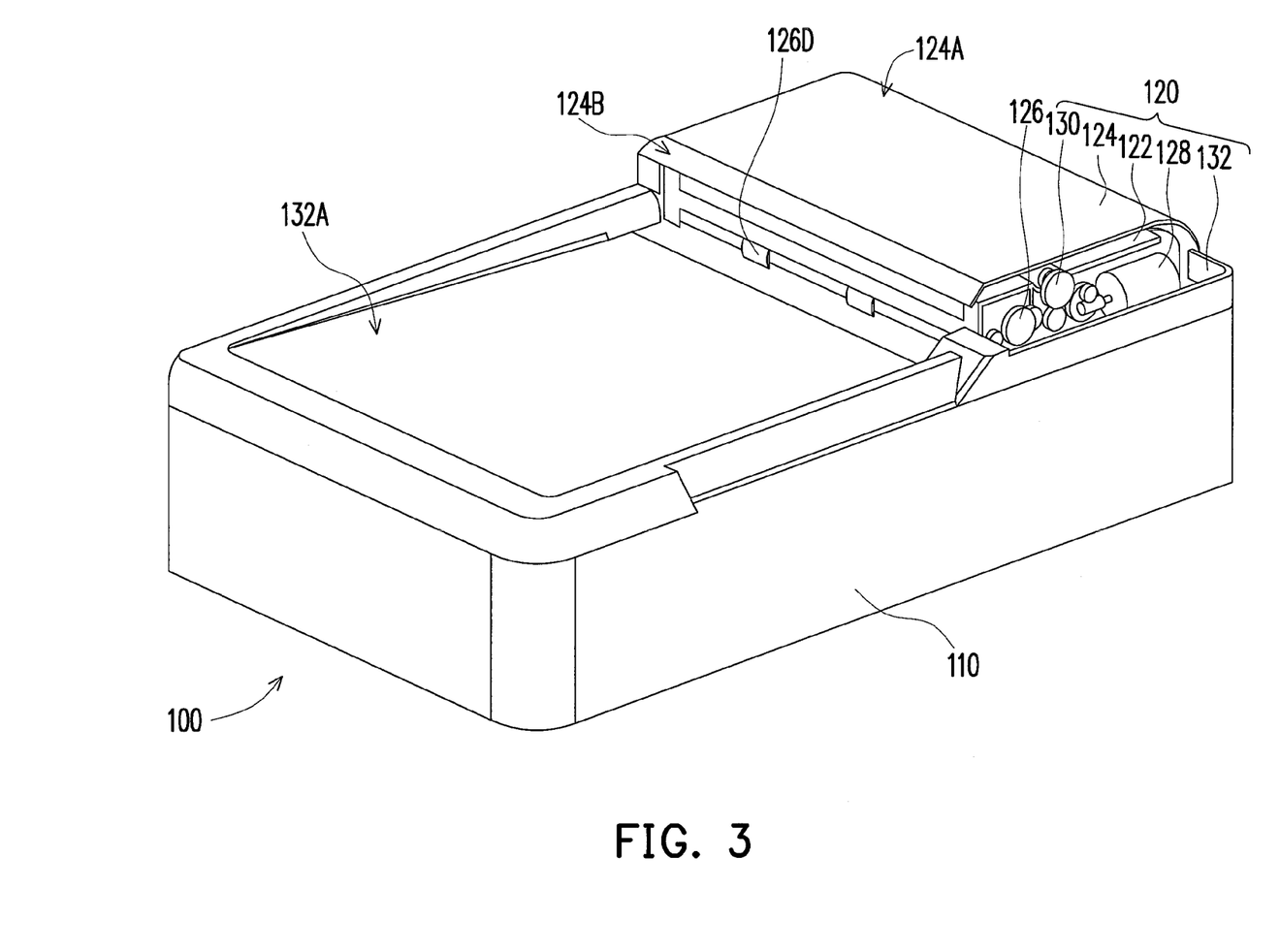
FIG. 3 is a three-dimensional view of a multi-function printer according to an embodiment of the present invention.
Figure 4:
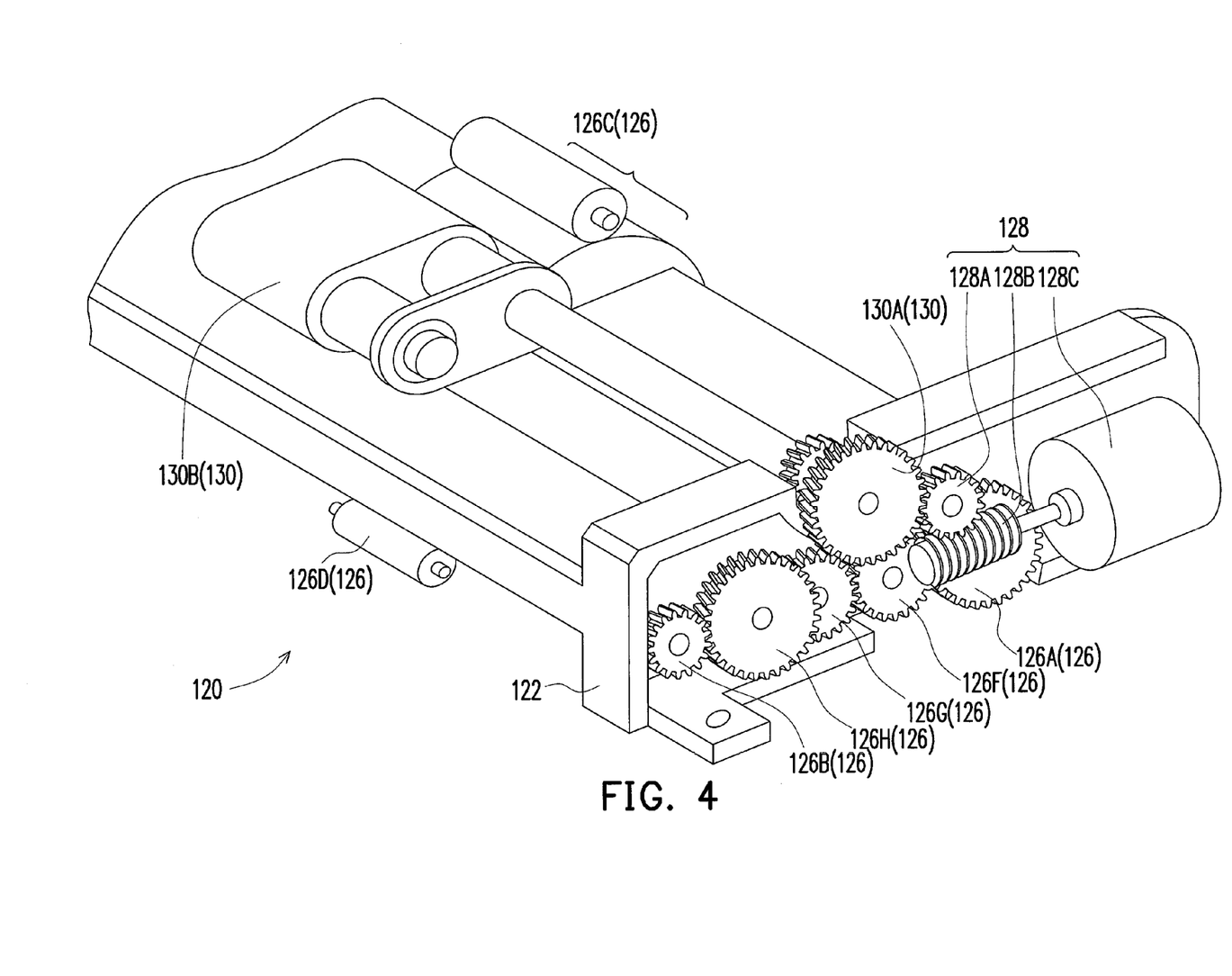
FIG. 4 is a partial three-dimensional view of the paper feeding device of FIG. 3.
Figure 8:
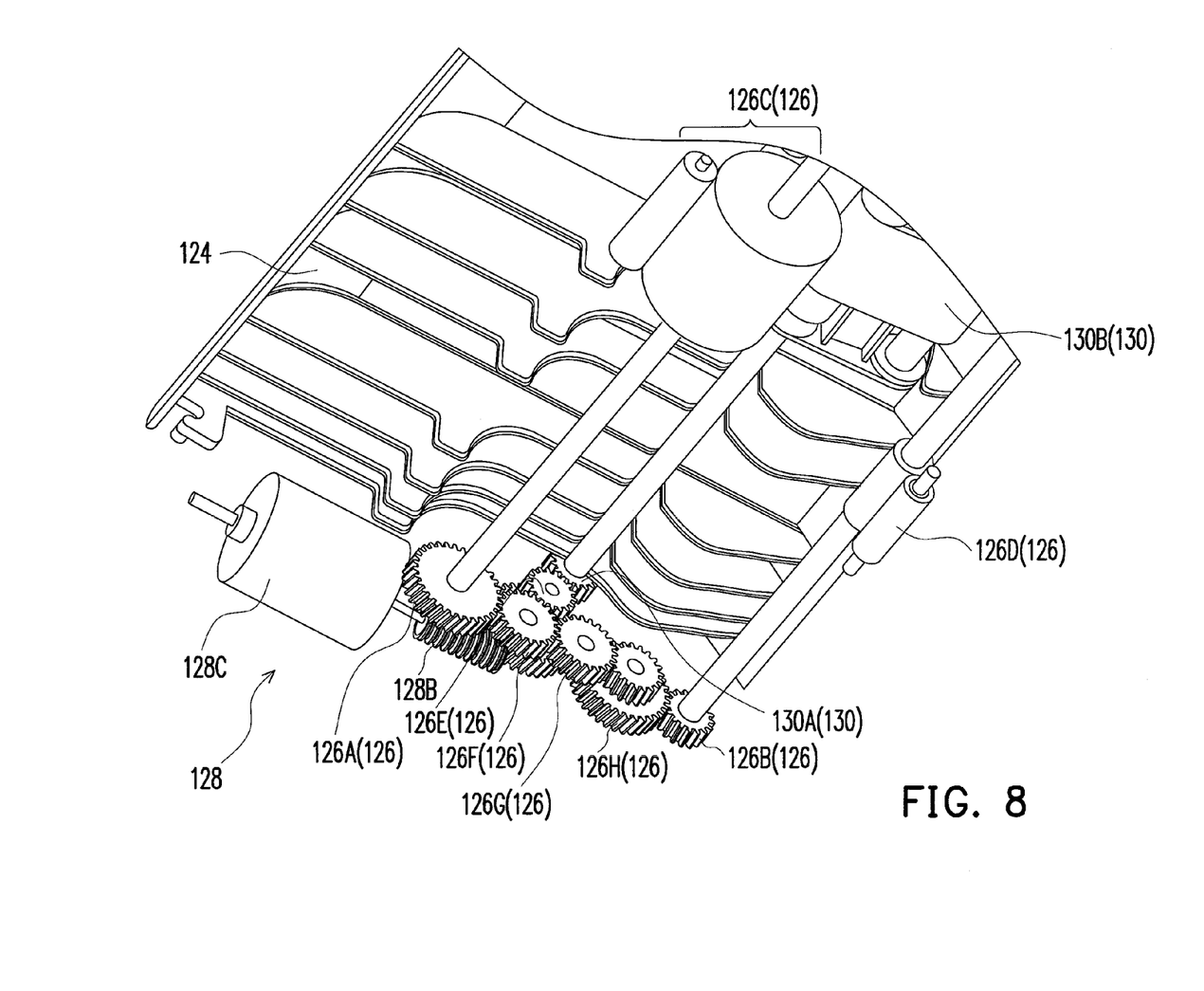
FIG. 8 is a partial three-dimensional view of the paper feeding device of FIG. 3 from another view angle.

FIG. 3 is a three-dimensional view of a multi-function printer according to an embodiment of the present invention. FIG. 4 is a partial three-dimensional view of a paper feeding device of FIG. 3. FIG. 8 is a partial three-dimensional view of the paper feeding device of FIG. 3 from another view angle. Referring to FIG. 3, FIG. 4, and FIG. 8, in this embodiment, the multi-function printer 100 includes a body 110 and a paper feeding device 120. The paper feeding device 120 includes a frame 122, a top cover 124, a set of gear chains 126, a power unit 128, and a set of driving gears 130. It should be noted that in order to clearly show components of the drawings, the top cover 124 of FIG. 3 is partially shown, and the top cover 124 and a bottom cover 132 of the paper feeding device 120 of FIG. 4 are not shown, and FIG. 8 does not show the frame 122 and the bottom cover 132.

Accordingly, the top cover 124 is disposed above the frame 122. The set of gear chains 126 is disposed on a side edge of the frame 122. The power unit 128 is disposed adjacent to the set of gear chains 126, and is located on the side edge of the frame 122 together with the set of gear chains 126. The set of driving gears 130 is disposed on the top cover 124 and assembled with the top cover 124. When the top cover 124 is closed relatively to the frame 122, the set of driving gears 130 interferes with the power unit 128, and the set of driving gears 130 is engaged with the set of gear chains 126, and the power unit 128 provides a power to enable the set of driving gears 130 to rotate, so as to drive the set of gear chains 126. When the top cover 124 is opened relatively to the frame 122, the set of driving gears 126 releases interference with the power unit 128 and the set of gear chains 126 along with moving of the top cover 124, and the set of gear chains 126 is at a free rotation status. When the set of gear chains 126 is at the free rotation status, a user may easily remove paper jammed in the set of gear chains 126.

In details, when the paper (not shown) is jammed in the paper feeding device 120, the user opens the top cover 124 relatively to the frame 122, and the set of driving gears 130 is increasingly away from the frame 122 and releases the interference with the set of gear chains 126 and the power unit 128 along with moving the top cover 124, and here the set of gear chains 126 is at the free rotation status. Therefore, the user rotates the set of gear chains 126 to enable the paper to exit from the paper feeding device 120, so as to release the paper jam, or directly pulls the paper to remove the paper from the set of gear chains 126 of the paper feeding device 120. On the contrary, after the paper jam is released, the user closes the top cover 124 relatively to the frame 122, the set of driving gears 130 is engaged with the power unit 128 and the set of gear chains 126, the power of the power unit 128 may be continuously delivered to the set of gear chains 126 through the set of driving gears 130. It may be known from the above mentioned that when the top cover 124 is opened, the user may randomly rotate the set of gear chains 126 to enable the paper to exit from the paper feeding device 120, thereby releasing the paper jam and preventing the paper from being dragged or broken resulting from the paper exiting in a single direction. Further, the user may directly pull out the jammed paper, as the set of gear chain 126 is at the free rotation status and a rotation direction is not limited, the set of gear chains 126 may freely rotate, and the paper is prevented from being dragged or broken during paper exiting. In addition, the paper feeding device 120 needs not to have a mechanism used to release paper jam, thereby reducing the number of parts of the multi-function printer 100, so as to lower a manufacturing cost.

Figure 5:
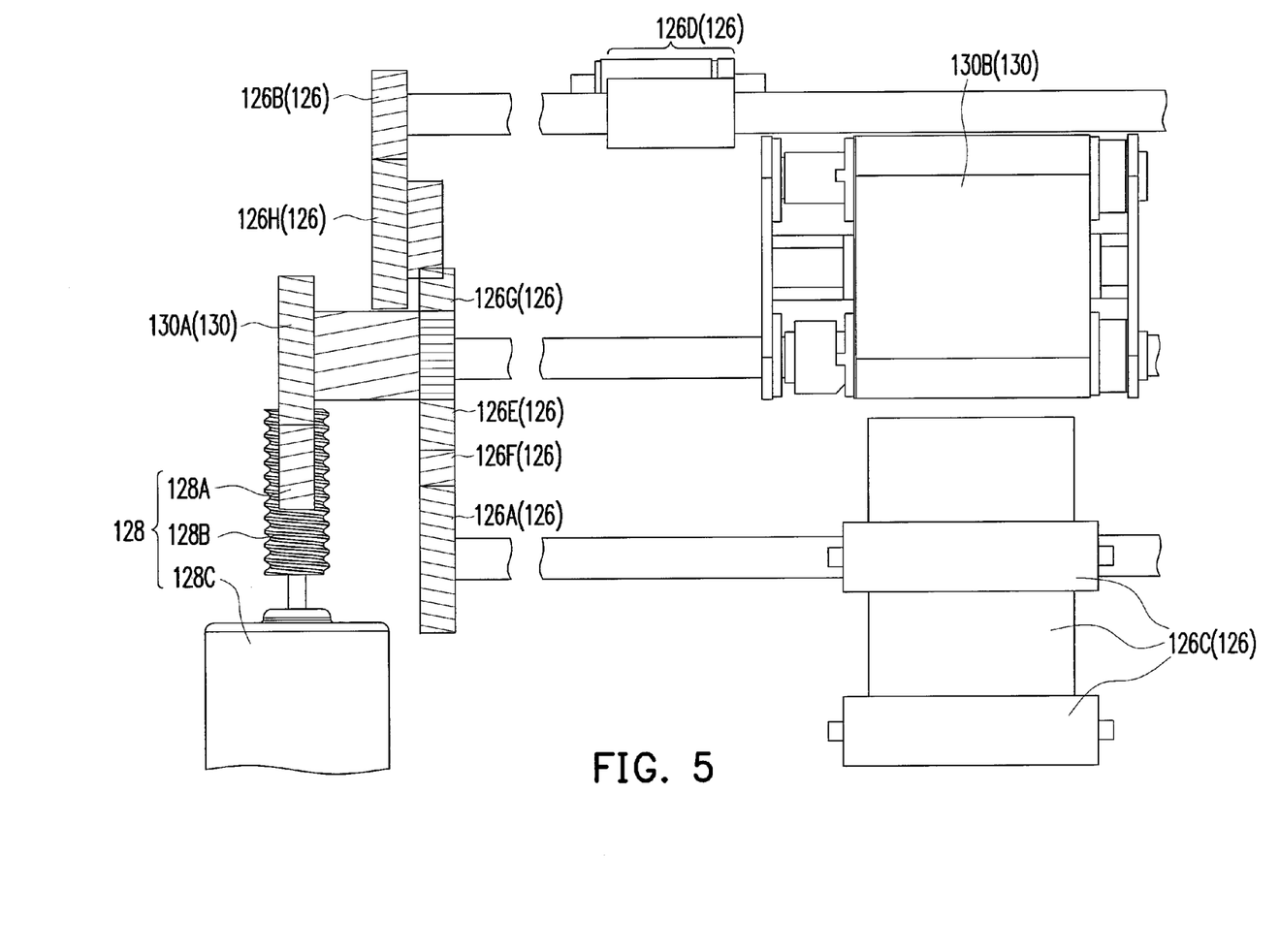
FIG. 5 is a top view of the paper feeding device removing frame of FIG. 4.
Figure 6:
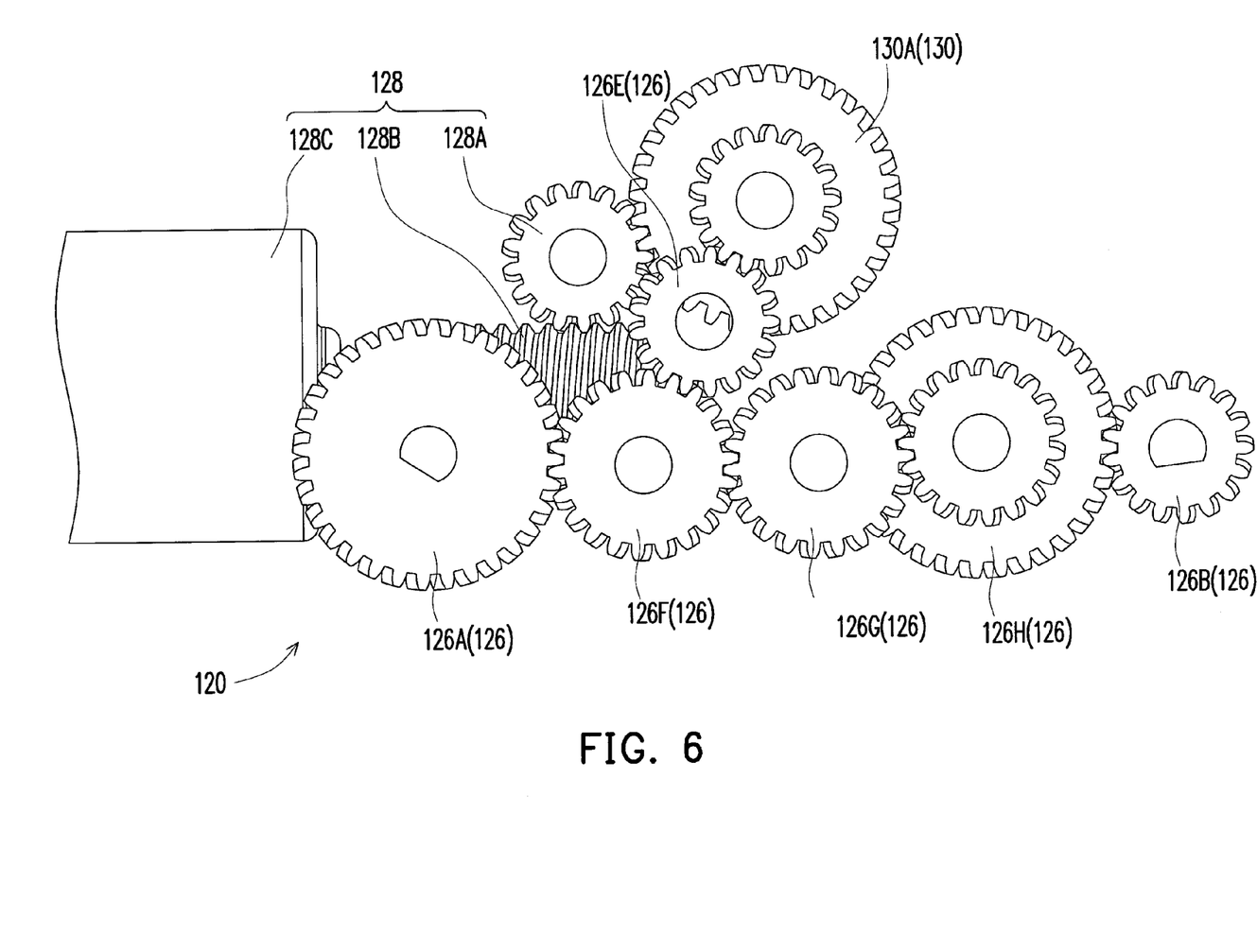
FIG. 6 is a rear view of the paper feeding device removing frame of FIG. 3.

FIG. 5 is a top view of the paper feeding device removing frame of FIG. 4. FIG. 6 is a rear view of the paper feeding device removing frame of FIG. 3. Referring to FIG. 4, FIG. 5, and FIG. 6, the set of gear chains 126 of this embodiment includes a first shaft gear 126A, a second shaft gear 126B, a scanning roller module 126C, a paper-out roller module 126D, a first slave gear 126E, a second slave gear 126F, a third slave gear 126G, and a fourth slave gear 126H, in which the first slave gear 126E, the second slave gear 126F, the third slave gear 126G, and the fourth slave gear 126H are located between the first shaft gear 126A and the second shaft gear 126B. The first shaft gear 126A is connected to the scanning roller module 126C, and the second shaft gear 126B is connected to the paper-out roller module 126D, in which the first shaft gear 126A is used to drive the scanning roller module 126C, and the second shaft gear 126B is used to drive the paper-out roller module 126D. In addition, the set of driving gears 130 includes a third shaft gear 130A and a paper-in roller module 130B, in which the third shaft gear 130A is configured between the first shaft gear 126A and the second shaft gear 126B. The third shaft gear 130A is connected to the paper-in roller module 130B, and is used to drive the paper-in roller module 130B. It should be noted that in order to simplify and clarify the drawing, proportions of the first shaft gear 126A, the second shaft gear 126B, and the third shaft gear 130A of FIG. 5 are adjusted.

Accordingly, after the paper is sent to the paper feeding device 120, the third shaft gear 130A is driven through the power unit 128, the third shaft gear 130A rotates to drive the paper-in roller module 130B to rotate, and the third shaft gear 130A drives the first slave gear 126E, the second slave gear 126F, the third slave gear 126G, and the fourth slave gear 126H to rotate, so as to enable the first shaft gear 126A and the second shaft gear 126B to rotate to drive the scanning roller module 126C and the paper-out roller module 126D to rotate. Therefore, the paper passes through the paper-in roller module 130B and the scanning roller module 126C in sequence to perform a printing procedure, and is set out from the paper-out roller module 126D after printing is finished.

In addition, the power unit 128 of this embodiment includes a connection gear 128A, an engagement member 128B, and a motor 128C. The connection gear 128A is engaged between the third shaft gear 130A and the engagement member 128B, and the motor 128C is used to drive the engagement member 128B to rotate to enable the connection gear 128A to drive the third shaft gear 130A to rotate, in which the motor 128C of this embodiment is a direct current motor, and the engagement member 128B is a worm. Through configuration of the worm, a reduction ratio of the set of gear chains 126 and the set of driving gears 130 may be increased, so as to reduce power loss of the motor 128C.

Figure 7:
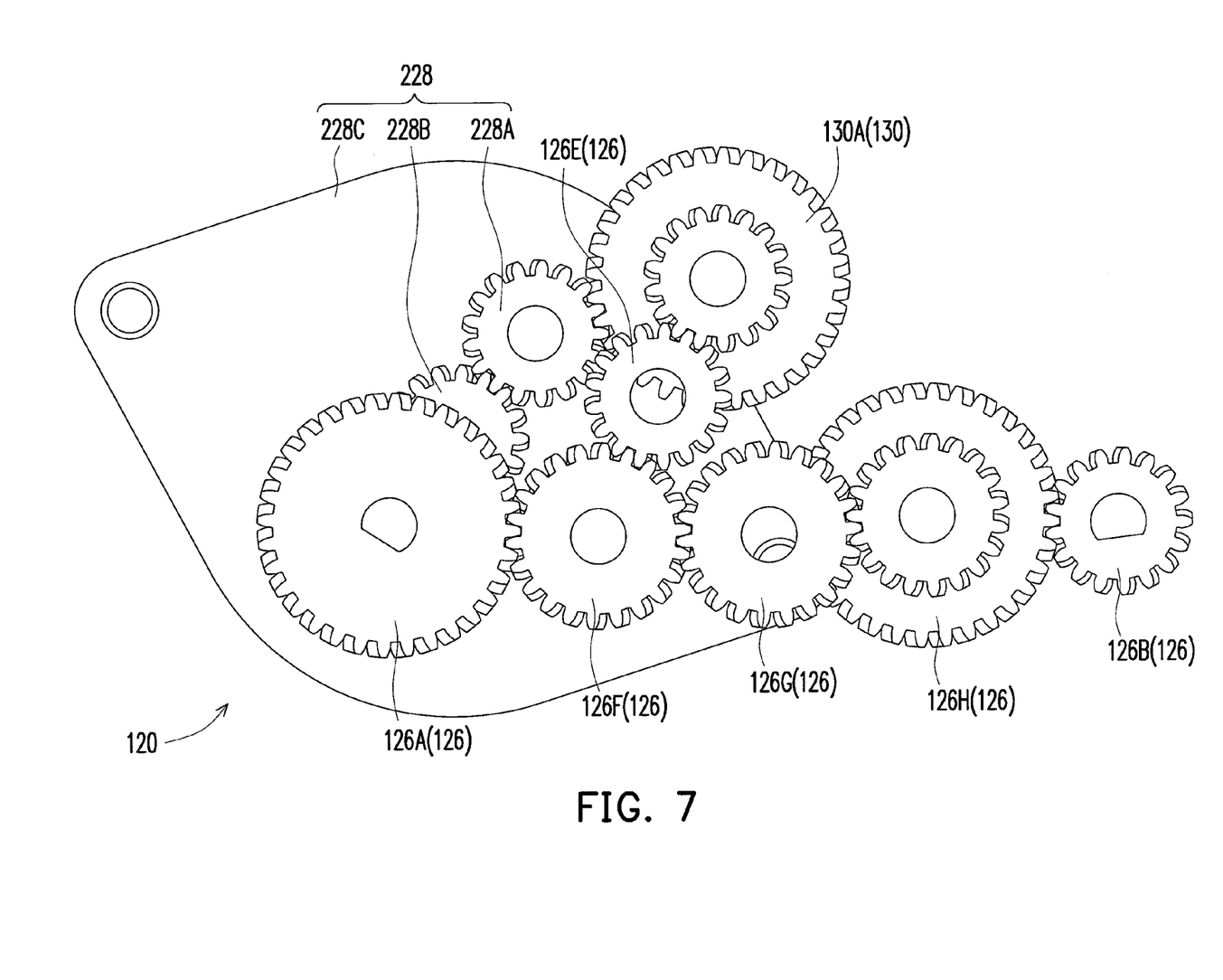
FIG. 7 is a rear view of another embodiment of the power unit of FIG. 6.

FIG. 7 is a rear view of another embodiment of the power unit of FIG. 6. Referring to FIG. 6 and FIG. 7, in this embodiment, a power unit 228 of FIG. 7 is similar to the power unit 128 of FIG. 6, here, only differences between the embodiment of FIG. 7 and the embodiment of FIG. 7 are described, in which the same or similar element numerals represent the same or similar elements. A motor 228C of this embodiment is a stepping motor, and an engagement member 228B is a gear. The present invention does not limit forms of the motor and the engagement member, and the user may combine the forms of the motor and the engagement member according to demands.

Referring to FIG. 3, the paper feeding device 120 of this embodiment further includes a bottom cover 132, in which the frame 122 is assembled on the bottom cover 132, and the top cover 124 has a first end 124A and a second end 124B. The first end 124A is pivoted to the bottom cover 132, and the second end 124B is adapted to be opened relatively to the bottom cover 132 by using the first end 124A as a rotation center. In addition, the bottom cover 132 may have a supporting surface 132A, when the paper is sent out from the paper-out roller module 126D, the paper may be placed on the supporting surface 132A.

To sum up, in the present invention, the set of driving gears of the paper feeding device is disposed on the top cover, when the top cover is opened, the user may conveniently randomly rotate the set of gear chains to enable the paper to exit from the paper feeding device, thereby releasing the paper jam and preventing the paper from being dragged or broken resulting from the paper exiting in the single direction. In addition, the paper feeding device of the present invention has the function of releasing the paper jam without the additional mechanism used to release the paper jam, so that the multi-function printer applying the paper feeding device may reduce the number of the parts and lower the manufacturing cost.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A paper feeding device, applicable to a multi-function printer, the paper feeding device comprising:
   a frame;
   a top cover, disposed on the frame;
   a set of gear chains, disposed on a side of the frame;
   a power unit, disposed adjacent to the set of gear chains, and located on the side of the frame together with the set of gear chains; and
   a set of driving gears, disposed on the top cover, wherein when the top cover is closed relatively to the frame, the set of driving gears interferes with the power unit, and the set of driving gears is engaged with the set of gear chains, and the power unit provides a power to enable the set of driving gears to rotate, so as to drive the set of gear chains, when the top cover is opened relatively to the frame, the set of driving gears releases interference with the power unit and the set of gear chains along with moving of the top cover, and the set of gear chains is at a free rotation status.

2. The paper feeding device according to claim 1, wherein the set of gear chains comprises a first shaft gear, a second shaft gear, a scanning roller module, a paper-out roller module, a first slave gear, a second slave gear, a third slave gear, and a fourth slave gear, the first shaft gear is connected to the scanning roller module, and the second shaft gear is connected to the paper-out roller module, and the first slave gear, the second slave gear, the third slave gear, and the fourth slave gear are located between the first shaft gear and the second shaft gear.

3. The paper feeding device according to claim 2, wherein the set of driving gears comprises a third shaft gear and a paper-in roller module, the third shaft gear is configured between the first shaft gear and the second shaft gear, and the third shaft gear is connected to the paper-in roller module, when the third shaft gear is driven through the power unit, the third shaft gear rotates to drive the paper-in roller module to rotate, and the third shaft gear drives the first slave gear, the second slave gear, the third slave gear, and the fourth slave gear to rotate, so that the first shaft gear and the second shaft gear rotate to drive the scanning roller module and the paper-out roller module to rotate.

4. The paper feeding device according to claim 3, wherein the power unit comprises a connection gear, an engagement member, and a motor, the connection gear is engaged between the third shaft gear and the engagement member, and the motor is used to drive the engagement member to rotate to enable the connection gear to drive the third shaft gear to rotate.

5. The paper feeding device according to claim 4, wherein the motor is a stepping motor.

6. The paper feeding device according to claim 4, wherein the motor is a direct current motor.

7. The paper feeding device according to claim 4, wherein the engagement member is a gear.

8. The paper feeding device according to claim 4, wherein the engagement member is a worm.

9. The paper feeding device according to claim 1, further comprising a bottom cover, wherein the frame is assembled on the bottom cover, and the top cover has a first end and a second end, the first end is pivoted to the bottom cover, and the second end is adapted to be opened relatively to the bottom cover by using the first end as a rotation center.

10. A multi-function printer, comprising:
    a body;
    a paper feeding device, assembled on the body, and comprising:
    a frame;
    a top cover, disposed on the frame;
    a set of gear chains, disposed on a side of the frame;
    a power unit, disposed adjacent to the set of gear chains, and located on the side of the frame together with the set of gear chains; and
    a set of driving gears, disposed on the top cover, wherein when the top cover is closed relatively to the frame, the set of driving gears interferes with the power unit, and the set of driving gears is engaged with the set of gear chains, and the power unit provides a power to enable the set of driving gears to rotate, so as to drive the set of gear chains, when the top cover is opened relatively to the frame, the set of driving gears releases interference with the power unit and the set of gear chains along with moving of the top cover, and the set of gear chains is at a free rotation status.

11. The multi-function printer according to claim 10, wherein the set of gear chains comprises a first shaft gear, a second shaft gear, a scanning roller module, a paper-out roller module, a first slave gear, a second slave gear, a third slave gear, and a fourth slave gear, the first shaft gear is connected to the scanning roller module, and the second shaft gear is connected to the paper-out roller module, and the first slave gear, the second slave gear, the third slave gear, and the fourth slave gear are located between the first shaft gear and the second shaft gear.

12. The multi-function printer according to claim 11, wherein the set of driving gears comprises a third shaft gear and a paper-in roller module, the third shaft gear is configured between the first shaft gear and the second shaft gear, and the third shaft gear is connected to the paper-in roller module, when the third shaft gear is driven through the power unit, the third shaft gear rotates to drive the paper-in roller module to rotate, and the third shaft gear drives the first slave gear, the second slave gear, the third slave gear, and the fourth slave gear to rotate, so that the first shaft gear and the second shaft gear rotate to drive the scanning roller module and the paper-out roller module to rotate.

13. The multi-function printer according to claim 12, wherein the power unit comprises a connection gear, an engagement member, and a motor, the connection gear is engaged between the third shaft gear and the engagement member, and the motor is used to drive the engagement member to rotate to enable the connection gear to drive the third shaft gear to rotate.

14. The multi-function printer according to claim 13, wherein the motor is a stepping motor.

15. The multi-function printer according to claim 13, wherein the motor is a direct current motor.

16. The multi-function printer according to claim 13, wherein the engagement member is a gear.

17. The multi-function printer according to claim 13, wherein the engagement member is a worm.

18. The multi-function printer according to claim 10, wherein the paper feeding device further comprises a bottom cover, wherein the frame is assembled on the bottom cover, and the top cover has a first end and a second end, the first end is pivoted to the bottom cover, and the second end is adapted to be opened relatively to the bottom cover by using the first end as a rotation center.

* * * * *